No. 835,252. PATENTED NOV. 6, 1906.
A. F. PASELK.
DRIVING GEAR FOR STEERING WHEELS.
APPLICATION FILED NOV. 4, 1905.
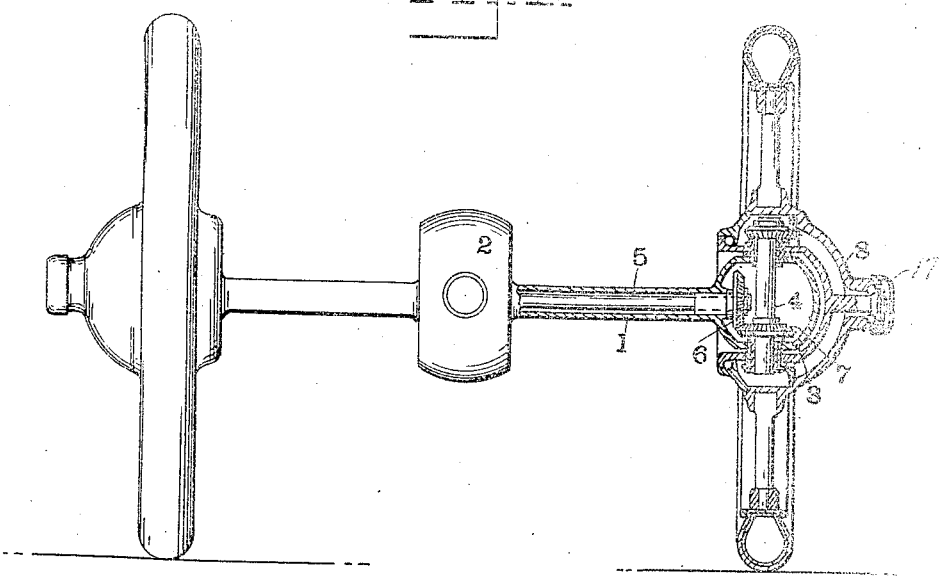
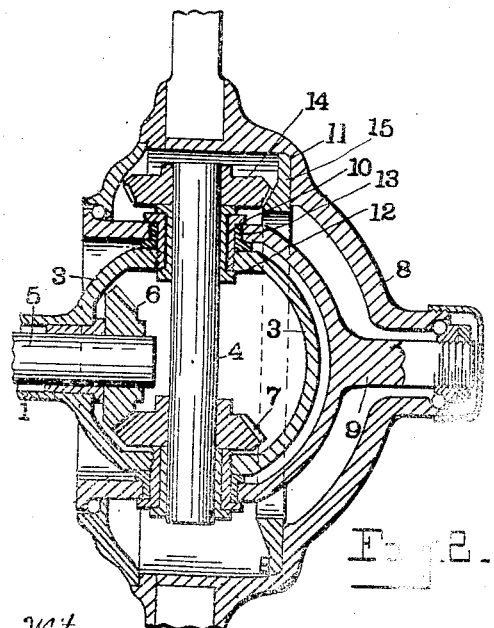
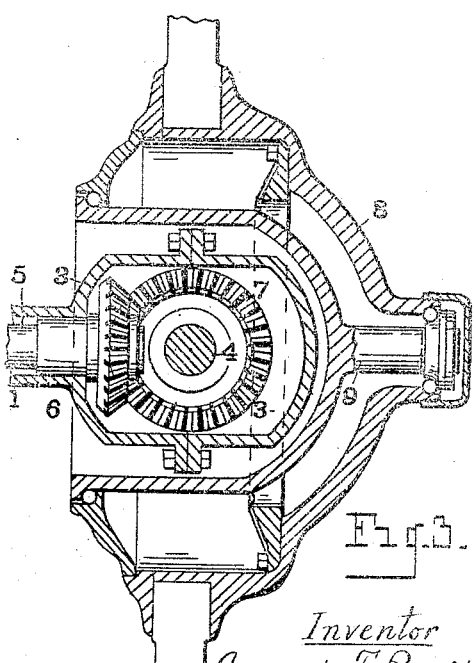
Witnesses.
O. B. Baenziger.
Lotta Lee Hayton.
Inventor
August F. Paselk
by
Parker + Burton.
Attorneys.

UNITED STATES PATENT OFFICE.

AUGUST F. PASELK, OF DETROIT, MICHIGAN.

DRIVING-GEAR FOR STEERING-WHEELS.

No. 835,252.  Specification of Letters Patent.  Patented Nov. 6, 1906.

Application filed November 4, 1905. Serial No. 285,830.

*To all whom it may concern:*

Be it known that I, AUGUST F. PASELK, a citizen of the United States, residing at Detroit, county of Wayne, State of Michigan, have invented a certain new and useful Improvement in Driving-Gear for Steering-Wheels; and I declare the following to be a full, clear, and exact description of the invention, such as will enable others skilled in the art to which it pertains to make and use the same, reference being had to the accompanying drawings, which form a part of this specification.

This invention relates to driving mechanism for vehicles.

It has for its object an improved means for driving the forward or steering wheels of the vehicle without interfering with the capacity of the individual wheel to be swung on its vertical axis.

In the drawings, Figure 1 shows a pair of wheels of which the right wheel is in section, and the mechanism of this invention is shown thereon. Fig. 2 is an enlarged view in section showing the driving-gear. Fig. 3 is a horizontal section through the hub.

1 indicates a hollow axle, which extends from the housing 2 of the differential gear at the middle of the axle outward and terminates with a housing 3, in which is located a vertical shaft 4, journaled in bearings in the housing. For structural reasons of assembling the parts the housing 3 is made in two parts, which are bolted together.

Within the hollow axle 1 is a driving-shaft 5, which extends from the differential gear in the housing 2 and terminates in the housing 3 and has mounted on its terminal a miter-gear 6. The vertical shaft 4 carries a miter-gear 7, which meshes with the gear 6. The hub 8 of the wheel is mounted on a short axle 9, that engages pivotally on the vertical shaft 4. The means of mounting consists of first a nipple 10, with a collar 11, which nipple is screwed into the housing 3. A bushing 12, located within the nipple 10, serves as the contact-bearing for the shaft 4. The collar 11 is at the outer end of the nipple outside the axle 9. Between the body of the nipple and the body of the axle is a short bushing 13, with a collar located inside the hollow of the axle or the fork of the axle and arranged to bear directly on the housing 3 and to serve as the pivotal bearing for the axle.

The shaft 4 carries at its outer end outside the housing and outside the wheel-axle, through which it protrudes, a miter-gear 14, which meshes with an annular gear 15, that is secured to the hub of the wheel. The wheel itself is held to the axle by ball-bearings, one set of which is at the outer end and engages between the hub 8 and the axle 9. The hub and the axle 9 are both provided with cups and cones to retain the balls in place, and a cap 17 is screwed onto the end of the hub to cover and protect the ball-race and the ends of the axle. On the opposite or inner side of the wheel the hub is drawn in or contracted to form a housing for the miter-gear 14, and at the contracted part the hub 8 and the inner end of axle 9 are provided with cups and cones to retain the balls. The two ball-tracks, with their contained balls, afford a long bearing along the axle as between the wheel and the short axle on which it turns, and the wheel itself is easily driven from the shaft 5, and nevertheless it can be easily and readily turned on the vertical axis 4 while the driving operation is in action.

What I claim is—

1. In combination with a hollow shaft, a housing on the end thereof, a wheel-axle pivotally mounted on the housing, a wheel rotatably mounted on the axle and having bearing engagement therewith at both ends thereof, a driving-shaft within the hollow axle, a second driving-shaft perpendicular to the first journaled to project through the housing, interconnecting gear between the driving-shaft and the second shaft, interconnecting gear between the wheel and the second shaft, the said last-mentioned interconnecting gear being located within a housing formed between the hub of the wheel and the wheel-axle, substantially as described.

2. In combination, a hollow axle terminating with a housing, a shaft within said hollow axle provided with a bevel-gear at its terminal within the housing, a second shaft at right angles to the driving-shaft journaled in bearings in the housing projecting through the housing and provided within the housing with a beveled gear and without the housing with a second beveled gear, a short wheel-axle concave and with the concavity engaging over the housing and being in pivotal connection with the second shaft, a wheel provided with a concave hub engaging with bearings at the outer end of said axle and at the inner end of said axle, with the second-mentioned shaft lying between the bearings, a beveled wheel carried by the hub and meshing with the beveled wheel on said shaft external to the housing terminating the hollow axle, substantially as described.

In testimony whereof I sign this specification in the presence of two witnesses.

AUGUST F. PASELK.

Witnesses:
CHARLES F. BURTON,
WILLIAM M. SWAN.